Patented May 16, 1939

2,158,958

UNITED STATES PATENT OFFICE 2,158,958

HYDROXY-ALKYL ETHERS OF 4-TERTIARY-ALKYL PHENOLS

Gerald H. Coleman and John W. Zemba, Midland, Mich., assignors to The Dow Chemical Company, Midland, Mich., a corporation of Michigan No Drawing. Application February 23, 1937, Serial No. 127,177

11 Claims. (Cl. 260—613)

This invention concerns hydroxy-alkyl ethers of phenol compounds having a formula:

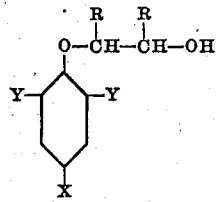

wherein one R represents hydrogen or the methyl radical, the other R represents hydrogen, X represents a tertiary-alkyl radical, and each Y represents an alkyl, chloro-, or bromo-radical, or hydrogen.

We have prepared members of this class of compounds, determined certain physical characteristics thereof whereby they may be readily identified, and found that they are particularly useful in the preparation of compositions for the control of household insect pests, such as fly sprays.

These new compounds may be prepared by reacting a suitable phenol compound with an halo-hydrin, e. g. ethylene bromohydrin, propylene-chlorohydrin, etc., in the presence of a suitable alkali, e. g. NaOH, KOH, etc.

In preparing our new compounds, the phenol may be dissolved in aqueous alkali and the halo-hydrin added thereto at a reaction temperature with stirring. If desired, however, the reaction may be carried out by first mixing the phenol with the halo-hydrin and subsequently adding thereto the alkali. While any suitable quantities of reactants may be employed, good yields of the desired products can be obtained when equimolecular proportions of reactants are used. The reaction may be conveniently carried out at the refluxing temperature of the mixture, but lower or higher temperatures may be employed. In certain cases where the reactants are not readily soluble in aqueous alkali, alcohol or other water-miscible organic solvent may be added to the reaction mixture. Following completion of the reaction the mixture is allowed to stand and separate into layers, the oily layer being subsequently separated, and the desired compound isolated therefrom by fractional distillation under reduced pressure or otherwise.

Other methods by which the compounds may be prepared are: (1) the condensation of the alkylene oxides with suitable ring-substituted phenols, and (2) the etherification of the dihydroxy paraffin hydrocarbons with the tertiary-alkyl substituted phenols.

The following examples describe the preparation of certain representative members of our new group of compounds, but are not to be construed as limiting the invention:

Example 1

150 grams (1 mol) of 4-tertiary-butyl phenol and 192 grams (1 mol) of a 42 per cent aqueous azeotrope of ethylene chlorohydrin were mixed together and 133 grams of a 30 per cent aqueous sodium hydroxide solution added thereto over a period of one hour at temperatures gradually increasing from 25° to 42° C. Stirring was maintained for an additional hour after which the reaction batch was allowed to stand for 16 hours at room temperature. An oily layer separated therefrom and was fractionally distilled, whereby 145 grams (0.748 mol) of the beta-hydroxy-ethyl ether of 4-tertiary-butyl phenol was obtained as a water white oil boiling at 126.5°–127.5° C. at 4 millimeters pressure, freezing at approximately 15° C. and having a specific gravity of 1.015 at 20°/4° C. This compound was substantially insoluble in water but somewhat soluble in most organic solvents.

Example 2

1 mol of 4-tertiary-amyl phenol, 1 mol of sodium hydroxide, and 2.5 mols of water were mixed together and 192 grams of a 42 per cent aqueous azeotrope of ethylene chlorohydrin reacted therewith substantially as described above. The resulting oily layer was fractionated, whereby there was obtained 0.35 mol of the beta-hydroxy-ethyl ether of 4-tertiary-amyl phenol. This compound is a water white liquid boiling at 145°–148° C. at 4 millimeters pressure, and having a specific gravity of 1.0045 at 20°/4° C.

Example 3

In a similar manner 1 mol each of 4-tertiary-octyl phenol, ethylene chlorohydrin, and sodium hydroxide were reacted together in the presence of 200 milliliters of 50 per cent ethanol and 111 milliliters of water, whereby there was obtained 0.768 mol of the desired ether product. Beta-hydroxy-ethyl ether of 4-tertiary-octyl phenol is a water white liquid boiling at 170°–173° C. at 6–7 millimeters pressure and having a specific gravity of 0.9860 at 20°/4° C.

Example 4

2 mols of 4-tertiary-butyl phenol, 2 mols of sodium hydroxide, and 400 milliliters of water were mixed together, and 2 mols of propylene chlorohydrin in the form of a 51 per cent aqueous azeotrope gradually added thereto over a period of 2 hours and at temperatures gradually increasing from 79° C. to 96.5° C. The reaction mixture was refluxed for a short time after the addition of the chlorohydrin, cooled, acidified, and the resulting oil separated therefrom. The latter was washed with water and distilled whereby there was obtained 1.4 mols of the hydroxy-propyl ether of 4-tertiary-butyl phenol as a white crystalline solid, melting at 45° C., and boiling at 150°–155° C. at 10 millimeters pressure.

Other compounds prepared in a similar manner include the following:

Beta-hydroxy-ethyl ether of 2-chloro-4-tertiary-butyl phenol, a water white liquid boiling at 130°–132° C. at 2 millimeters pressure, and having a specific gravity of 1.121 at 20°/4° C.;

Beta-hydroxy-ethyl ether of 2-methyl-4-tertiary-butyl phenol, a white crystalline solid melting at 36° C., and boiling at 130°–132° C. at 3 millimeters pressure;

Beta-hydroxy-ethyl ether of 2,4-di-tertiary-butyl-6-chlorophenol, a thick viscous liquid boiling at 151°–154° C. at 2 millimeters pressure, and having a specific gravity of 1.072 at 20°/4° C.

Among other hydroxy-alkyl ethers which may be prepared by substituting other tertiary-alkyl-substituted phenol compounds for those shown in the examples are: beta-hydroxy-ethyl ether of 2-bromo-4-tertiary-butyl phenol; beta-hydroxy-ethyl ether of 2,6-di-bromo-4-tertiary-butyl phenol; beta-hydroxy-ethyl ether of 2,6-di-chloro-4-tertiary-butyl phenol; beta-hydroxy-ethyl ether of 2-chloro-4-tertiary-butyl-6-bromo-phenol; beta-hydroxy-ethyl ether of 2-methyl-4-tertiary-butyl-6-chloro-phenol; beta-hydroxy-ethyl ether of 2-methyl-4-tertiary-butyl-6-bromo-phenol; beta-hydroxy-ethyl ether of 2-n-propyl-4-tertiary-butyl phenol; beta-hydroxy-ethyl ether of 2-methyl-4,6-ditertiary-butyl phenol; beta-hydroxy-ethyl-ether of 2-bromo-4-tertiary-amyl phenol; beta-hydroxy-ethyl ether of 2,6-di-bromo-4-tertiary-amyl phenol; beta-hydroxy-ethyl ether of 2,6-dichloro-4-tertiary-amyl phenol; beta-hydroxy-ethyl ether of 2-bromo-6-chloro-4-tertiary-amyl phenol; beta-hydroxy-ethyl ether of 2-methyl-4-tertiary-amyl-6-chloro-phenol; beta-hydroxy-ethyl ether of 2-methyl-4-tertiary-amyl-6-bromo-phenol; beta-hydroxy-ethyl ether of 2,4-ditertiary-amyl-phenol; beta-hydroxy-ethyl ether of 2,4-ditertiary-amyl-6-chloro-phenol; beta-hydroxy-ethyl ether of 4-tertiary-hexyl phenol; beta-hydroxy-ethyl ether of 2-bromo-4-tertiary-hexyl phenol; beta-hydroxy-ethyl ether of 2,6-dichloro-4-tertiary-heptyl phenol; beta-hydroxy-ethyl ether of 2-chloro-4-tertiary-heptyl phenol; beta-hydroxy-ethyl ether of 2-chloro-4-tertiary-octyl phenol; beta-hydroxy-ethyl ether of 2,6-dibromo-4-tertiary-octyl phenol; beta-hydroxy-ethyl ether of 2-methyl-4-tertiary-octyl phenol; beta-hydroxy-ethyl ether of 2-n-propyl-4-tertiary-octyl phenol; beta-hydroxy-ethyl ether of 2-methyl-4-tertiary-octyl-6-bromo-phenol; hydroxy-propyl ether of 2,4-ditertiary-butyl-6-methyl phenol; hydroxy-propyl ether of 4-tertiary-amyl phenol; hydroxy-propyl ether of 2-bromo-4-tertiary-amyl phenol; hydroxy propyl ether of 2-chloro-4-tertiary amyl phenol; hydroxy-propyl ether of 2,4-ditertiary-amyl-6-methyl phenol; hydroxy-propyl ether of 2,4-ditertiary-amyl-6-bromo-phenol; hydroxy-propyl ether of 2-n-propyl-4-tertiary-amyl phenol; hydroxy-propyl ether of 4-tertiary-hexyl phenol; hydroxy-propyl ether of 4-tertiary-heptyl phenol; hydroxy-propyl ether of 2-bromo-4-tertiary-octyl phenol; hydroxy-propyl ether of 4-tertiary-octyl phenol; hydroxy-propyl ether of 2,6-dichloro-4-tertiary-octyl phenol; hydroxy-propyl ether of 2-chloro-4-tertiary-octyl-6-bromo-phenol; hydroxy-propyl ether of 2-methyl-4-tertiary-octyl-6-chloro-phenol; hydroxy-propyl ether of 2,6-dimethyl-4-tertiary-octyl phenol; etc.

Certain of the compounds described in the foregoing examples have been tested by the Peet-Grady method (Soap, 8, No. 4, 1932) and found to be particularly valuable as fly spray toxics. For example, a 3 per cent solution of beta-hydroxy-ethyl ether of 4-tertiary-butyl phenol in kerosene, when tested against houseflies, was found to give in excess of a 90 per cent knock-down and an average kill of over 45 per cent in 24 hours. A 5 per cent kerosene solution of beta-hydroxy-ethyl ether of 4-tertiary-octyl phenol killed 19.7 per cent of houseflies contacted therewith when tested in a similar manner.

This application is a continuation in part of our co-pending application Serial No. 126,810, filed February 20, 1937.

Other modes of applying the principle of our invention may be employed instead of those explained, change being made as regards the materials employed provided the products described in the following claims be thereby obtained.

We, therefore, particularly point out and distinctly claim as our invention:

1. A compound having the formula

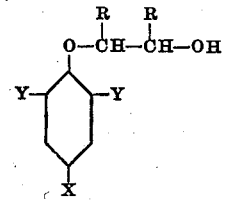

wherein one R represents hydrogen, the other R represents a member of the group consisting of methyl and hydrogen, X represents a tertiary-alkyl group containing not more than 5 carbon atoms, one Y represents halogen, and the other Y represents a member of the group consisting of halogen and hydrogen.

2. A compound having the formula

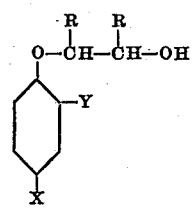

wherein one R represents hydrogen, the other R represents a member of the group consisting of methyl and hydrogen, X represents a tertiary-alkyl radical containing not more than 5 carbon atoms, and Y represents halogen.

3. A compound having the formula

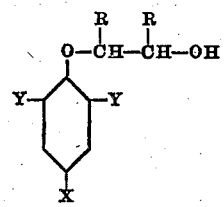

wherein one R represents hydrogen, the other R represents a member of the group consisting of methyl and hydrogen, X represents a tertiary-alkyl group containing not more than 5 carbon atoms, one Y represents chlorine, and the other Y represents a member of the group consisting of chlorine and hydrogen.

4. A compound having the formula

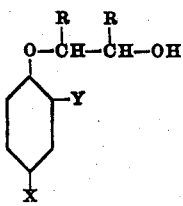

wherein one R represents hydrogen, the other R represents a member of the group consisting of methyl and hydrogen, X represents a tertiary-alkyl radical containing not more than 5 carbon atoms, and Y represents chlorine.

5. A compound having the formula

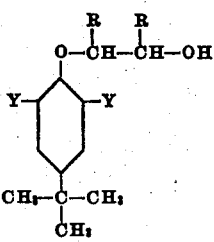

wherein one R represents hydrogen, the other R represents a member of the group consisting of methyl and hydrogen, one Y represents halogen, and the other Y represents a member of the group consisting of halogen and hydrogen.

6. A compound having the formula

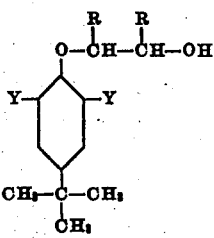

wherein one R represents hydrogen, the other R represents a member of the group consisting of methyl and hydrogen, one Y represents chlorine, and the other Y represents a member of the group consisting of chlorine and hydrogen.

7. A compound having the formula

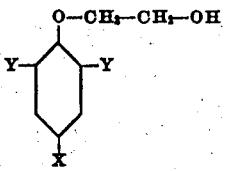

wherein X represents a tertiary-alkyl radical containing not more than 5 carbon atoms, one Y represents halogen, and the other Y represents a member of the group consisting of halogen and hydrogen.

8. A compound having the formula

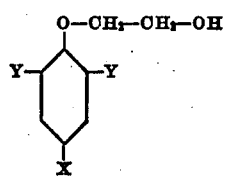

wherein X represents a tertiary-alkyl radical containing not more than 5 carbon atoms, one Y represents chlorine, and the other Y represents a member of the group consisting of chlorine and hydrogen.

9. A compound having the formula

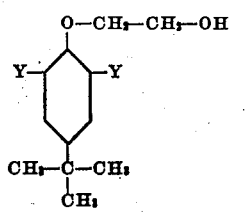

wherein one Y represents halogen, and the other Y represents a member of the group consisting of halogen and hydrogen.

10. A compound having the formula

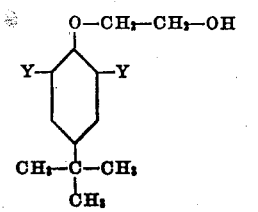

wherein one Y represents chlorine and the other Y represents a member of the group consisting of chlorine and hydrogen.

11. A compound having the formula

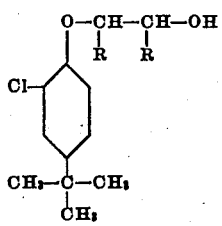

wherein one R represents hydrogen, and the other R represents a member of the group consisting of the methyl radical and hydrogen.

GERALD H. COLEMAN.
JOHN W. ZEMBA.